United States Patent [19]

van Oorschot

[11] 4,405,345
[45] Sep. 20, 1983

[54] DEVICE FOR SEPARATING LIQUID FROM LIQUID-CONTAINING COMPRESSED GAS

[75] Inventor: Gosewinus F. van Oorschot, Breda, Netherlands

[73] Assignee: Atlas Copco Aktiebolag, Nacka, Sweden

[21] Appl. No.: 346,239

[22] Filed: Feb. 5, 1982

[30] Foreign Application Priority Data

Mar. 9, 1981 [SE] Sweden ................................ 8101460

[51] Int. Cl.³ ............................................. B01D 19/00
[52] U.S. Cl. ....................................... 55/184; 55/186; 55/325; 55/330; 55/337
[58] Field of Search ................................... 55/184–188, 55/316, 325, 329, 330, 337, DIG. 17

[56] References Cited

U.S. PATENT DOCUMENTS

| | | | |
|---|---|---|---|
| 1,553,973 | 9/1925 | Ballou | 55/185 X |
| 2,489,370 | 11/1949 | Fowler | 55/186 |
| 3,653,191 | 4/1972 | Nelson et al. | 55/337 X |
| 3,654,748 | 4/1972 | Bloom | 55/330 X |
| 4,092,137 | 5/1978 | Howe et al. | 55/337 |
| 4,113,450 | 9/1978 | Goransson et al. | 55/337 X |
| 4,300,918 | 11/1981 | Cary | 55/337 X |
| 4,323,375 | 4/1982 | Chang | 55/DIG. 17 |

FOREIGN PATENT DOCUMENTS

611865 10/1926 France ................................. 55/329
20345 of 1910 United Kingdom .................. 55/329

*Primary Examiner*—Robert H. Spitzer
*Attorney, Agent, or Firm*—Eric Y. Munson

[57] ABSTRACT

A device for separating liquid from liquid-containing compressed gas. The device comprises two tanks (1,4) one situated above the other. The lower tank (1) is provided with a compressed gas inlet (2) which is directed against a surface (3) of the tank to cause separation of the major part of the liquid. The upper tank (4) is provided with a shell (6) having an access opening (9) at its upper end. The gas flow enters the upper tank (4) through a conduit (12) and passes then through opening (9) and a zigzag-shaped channel formed by walls (10,3,14,15) in shell (6). The gas flow then passes through filter (5,16). Separation is performed in several steps by change of direction of the gas flow and by filtering. Positioning of the access opening (9) at the top allows considerable expansion of the liquid-gas mixture without contamination of the filter (5,16).

4 Claims, 3 Drawing Figures

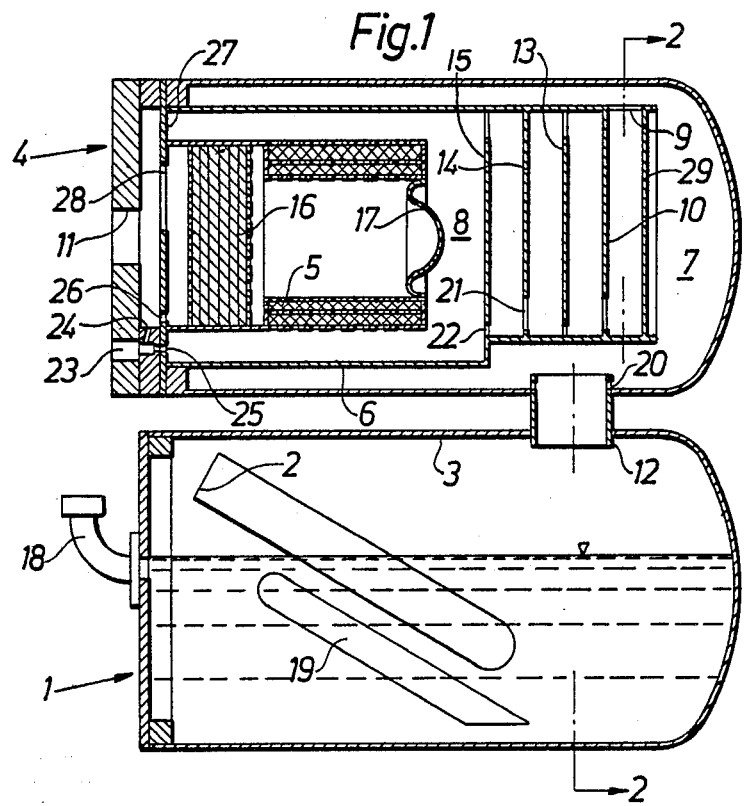
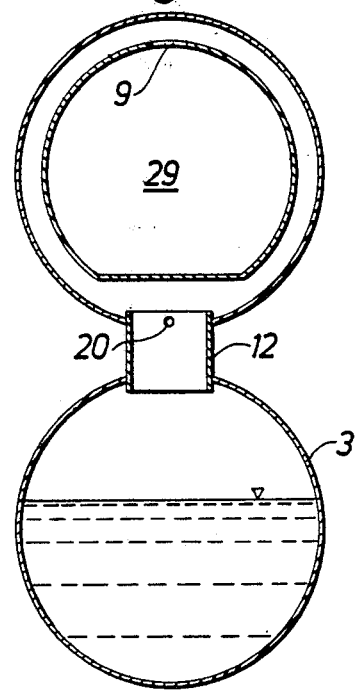
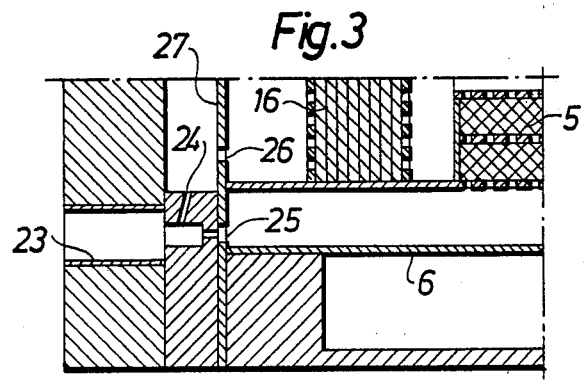

DEVICE FOR SEPARATING LIQUID FROM LIQUID-CONTAINING COMPRESSED GAS

The present invention relates to a device for separating liquid from liquid-containing compressed gas.

When separating liquid from liquid-containing compressed gas, as for example compressed in a liquid injected screw compressor, a two-stage separator is frequently used. The first stage separation is obtained by directing the liquid-containing compressed gas against an inner surface of a tank such that the gas flow is forced to change direction. Because of this the major part of the liquid is separated through centrifugal action. The compressed gas is then conducted through a filter acting as a second separator stage. Examples of such two-stage separation are given in U.S. Pat. Nos. 4,092,137 and 4,113,450.

In order to reduce the power consumption at unload, or the starting torque at motor start, the pressure in the liquid separator is relieved when the compressor is unloaded or stopped. Since the liquid separated and collected in the liquid separator contains a large amount of very small gas bubbles under pressure and which only slowly leave the liquid, a considerable expansion of the liquid-gas mixture is obtained when the pressure is lowered. As a result unacceptable amounts of liquid may reach beyond the separator when the compressor is restarted. The separator according to the above mentioned U.S. Pat. No. 4,113,450 is provided with a valve to prevent such expansion.

It is an object of the present invention to provide a separating device which gives excellent separation of the liquid, almost no problems with expanding liquid-gas mixture and which is compact in design. This is obtained with a device as defined by the appended claims.

An embodiment of the invention is described below with reference to the accompanying drawings in which FIG. 1 shows a longitudinal section through a separator according to the invention.

FIG. 2 shows a section according to 2—2 in FIG. 1.

FIG. 3 shows a detail of the separator according to FIG. 1.

The liquid separator shown in the drawings comprises a lower first compartment 1 and a second upper compartment 4. These compartments are formed as separate cylindrical tanks which are interconnected by a tube 12. The lower compartment is provided with tube having an inlet opening 2 for supply of liquid-containing compressed gas to the lower tank 1. The inlet opening 2 is directed against the wall 3 so that the gas flow is forced to change its direction, whereby the major part of the liquid is separated and collected on the bottom of the tank. Tank 1 is further provided with a conduit 19 through which liquid is fed from the tank through a cooler and a filter (not shown) to the injection opening of a liquid-injected compressor (not shown). Tank 1 is further provided with a filler neck 18 for filling liquid into the system.

The upper compartment 4 is divided into an outer chamber 7 and an inner chamber 8 by a shell 6. The shell is provided with an access opening 9 at its upper end and a number of parallel walls 29, 10, 13, 14 and 15. The compressed gas enters the inner chamber through the access opening 9 and a zigzag-shaped channel formed by the parallel walls. Upper tank 4 further comprises a filter 5, 16 being coaxial with the shell 6. After having passed the filter the compressed gas leaves the separator through a hole 28 in the upper part of plate 27 and the outlet opening 11.

The liquid is separated in several steps. First, the major part is separated at the entry into lower tank 1 as described above. Second, separation is obtained in the outer chamber 7 of upper tank 4 because of change of flow direction. Third, separation is obtained in the zigzag-shaped channel. Fourth, separation is obtained in the filter 5, 16, which comprises a cylindrical sleeve 5 and a flat piece 16 covering the cross-sectional area of the sleeve at the outlet end thereof. A fluidtight cover 17 seals the end of sleeve 5 which is directed away from outlet opening 11.

In order to obtain cheaper manufacturing, tube 12 extends into upper tank 4 and is provided with small holes 20 through which liquid separated in outer chamber 7 flows back to the lower compartment 1. Liquid separated in the zigzag-shaped channel is drained to inner chamber 8 through small holes 21, 22 at the lower ends of walls 13 and 15. Liquid on the inside of shell 6 is drained through opening 25 to scavenge connection 23. Liquid separated by the filter 5, 16 is normally collected on the inside of the final separator 5, 16 and is drained to scavenge connection 23 through a hole 26 in plate 27 and a hole 24. Holes 24, 25 are dimensioned such relative to the dimension of the conduit leading away from scavenge connection 23 that there is always a lower pressure at the scavenge connection than in the inner chamber 8 and inside the final separator to ensure that drainage is always obtained.

I claim:

1. Device for separating liquid from liquid-containing compressed gas, comprising:
   (a) a first horizontal tank (1) defining a first stage separation compartment;
   (b) nozzle means (2) for injecting a stream of compressed air and liquid into said first stage compartment, said nozzle means inclining towards the interior wall of said compartment to impart a centrifugal action to said stream as it impinges against said wall to thereby separate liquid from the compressed gas;
   (c) a second horizontal tank (4) defining a second stage separation compartment mounted above said first horizontal tank;
   (d) a closed horizontal shell (6) having an inlet and an outlet mounted within said second tank (4), defining an outer chamber (7) and an inner chamber (8) in said second stage separation compartment;
   (e) means for passing the first stage separation product into said outer chamber (7);
   (f) an opening (9) in the upper wall of said shell, at the inlet end thereof, for passing the first stage separation product into said inner chamber (8);
   (g) baffle means (10, 13, 14, 15) in said shell (6) downstream of said opening (9), imparting a reversing flow pattern to said first stage separation product as it is passed into said inner chamber (8) to thereby produce a further gas and liquid separation;
   (h) filter means (5) in said inner chamber (8) downstream of said baffle means for final separation of liquid from the compressed gas;
   (i) the outlet end of said shell having gas escape means (28) allowing the filtered compressed gas to pass into said tank (4); compressed air therefrom; and (k) means for removing separated liquid from said second stage separation compartment.

2. Device according to claim 1, in which said means for removing separated liquid from said second stage separation compartment comprises scavenger means (23, 24, 25, 26), said means being calibrated to maintain in said compartment a pressure sufficiently high to bleed the liquid therefrom.

3. Device according to claim 2, in which said means for removing separated liquid comprises additional means (20) for draining liquid into said first tank.

4. Device according to claim 1, in which said filter means is mounted co-axially with said shell (6) and is defined by an annular cylindrical filter sleeve, an end filter member (16) facing said gas escape means (28), and a fluid-tight closure member (17).

* * * * *